Feb. 18, 1964  E. M. TODD ETAL  3,121,328
RECORDING TENSIOMETER
Filed Dec. 2, 1960  2 Sheets-Sheet 1

INVENTORS
EUGENE M. TODD
ROBERT C. SHAAK
BY
ATTORNEY

United States Patent Office 3,121,328
Patented Feb. 18, 1964

3,121,328
RECORDING TENSIOMETER
Eugene M. Todd, Doylestown, and Robert C. Shaak, Hatboro, Pa., assignors to the United States of America as represented by the Secretary of the Navy
Filed Dec. 2, 1960, Ser. No. 73,463
2 Claims. (Cl. 73—143)
(Granted under Title 35, U.S. Code (1952), sec. 266)

The invention described herein may be used by or for the Government of the United States of America for governmental purposes without the payment of any royalties thereon or therefor.

This invention relates to a recording tensiometer and more particularly to a tensiometer for recording with respect to time the tension variations of a towline used in aircraft target towing.

The towing of targets by transonic and supersonic aircraft has involved the problem of accurately determining towline drag appearing as variations in towline tension. In the past, with conventional type aircraft, it was possible to determine towline drag by calculations which took into consideration all the known forces acting on a towline used to carry a target system. With the advent of transonic and supersonic aircraft it became apparent that the calculation method previously used for conventional aircraft towed target systems was not adequate to determine towline drag and towline tension in the towline of a target system towed by a supersonic aircraft since the forces acting on the towline were not accurately known at such speeds. Therefore, it became necessary to find an instrument for recording the tension of a towline carrying a target system at or above supersonic speeds.

At first various known methods were used in the hope of finding a device capable of accurate determination of towline tension in the supersonic range but none of the known methods proved to be suitable. One such known method of determining tension in tow lines involved the use of a mechanical recorder which utilized a heavy coil spring having a deflection approximately proportional to the load on the towline. However, it was found that this method had the disadvantage of nonlinearity. In other words, the inherent nature of a heavy coil spring causes it to have minute deflections under light loading and large deflections under heavy loading. A further disadvantage of this old method is the subsequent rebound and oscillations which occur when the spring is rapidly unloaded.

This invention is an improvement over known methods and contemplates the use of a Belleville washer assembly which provides linear displacements of a thrust shaft in response to variations in the tension variations in a towline.

Therefore, it is an object of the present invention to provide a system for accurately recording the tension in a towline remote from the towing vehicle to determine towline drag of supersonic target towing systems.

Another object of this invention is to provide a recording tensiometer which is uniformly sensitive to each degree of loading.

A further object of this invention is to record the tension in a towline remote from the towing vehicle wherein the tensiometer forms part of the towline.

Other objects and advantages of the invention will hereinafter become more fully apparent from the following description of the annexed drawings in which.

Figure 1:
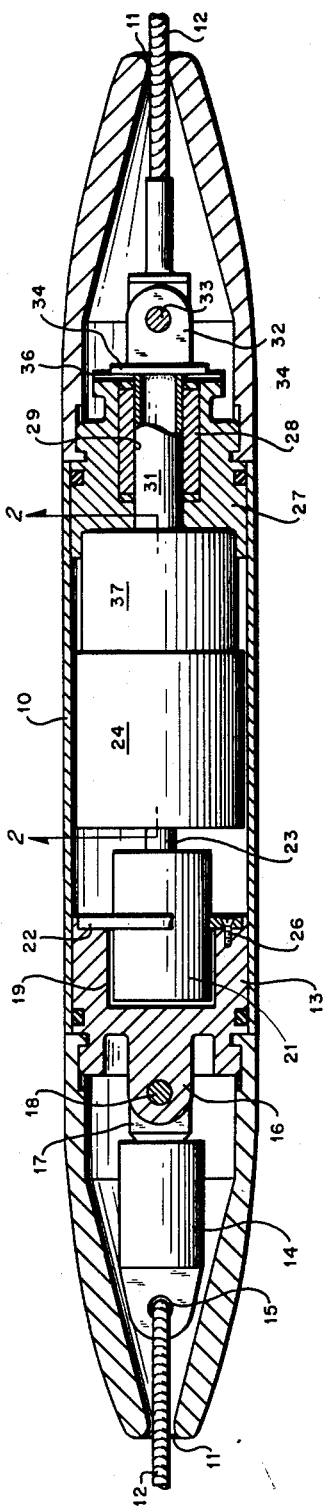
FIG. 1 is a view partially in section showing a configuration of the tensiometer as it is arranged in its housing.

Referring now to the drawings, wherein like reference numerals designate like or corresponding parts through the several views, there is shown in FIG. 1 a tubular housing 10 having openings 11 at each end to enable the towline to pass through and into the housing 10. A plug 13 is fixedly secured to the housing in any conventional manner as by a spline shoulder arrangement. Towline 12 is connected to the plug 13 through a swivel assembly 14 which has an eye 15 for securing the cable to the swivel assembly. The swivel assembly 14 is connected to the plug 13 by means of connecting rod 17 which is connected to a bifurcated plug extension 16 by a swivel coupling 18. Rod 17 is connected to swivel assembly 14 by a conventional ball and socket arrangement, not shown.

Plug 13 has a recess 19 in which a motor 21 is mounted. A support 22 is rigidly secured to motor 21 as by welding and is fixedly secured to plug 13 as by screw 26. Motor 21 rotates a recording drum 24 at a constant speed through a shaft 23 which is rigidly attached to recording drum 24.

Another plug 27 is fixedly secured to the housing 10 in a manner similar to that of plug 13. A thrust bearing 28 is force fitted into a countersunk bore of plug 27. Plug 27 has a bore 29 that has the same diameter as the inside diameter of thrust bearing 28, so that bore 29 along with thrust bearing 28 forms an opening of uniform diameter through which extends a shaft 31. Towline 12 is connected to shaft 31 by means of a bifurcated member 32 which is formed integral with shaft 31 to provide a swivel coupling 33. The bifurcated member 32 has a flange 34 which abuts against the end wall 36 of the plug 27 to thereby limit movement of shaft 31 to the left.

A cylindrical casing 37 is mounted or affixed to plug 27 to act as a support for a stylus assembly in a manner hereinafter described.

From the foregoing description it should be apparent that the tensiometer shown in FIG. 1 is designed and constructed in such a manner that it can be inserted in and become part of a towline. For example, the towline 12 is cut and the end nearest the aircraft is secured to swivel assembly 14 while the end nearest the towed target is secured to bifurcated assembly 32.

Figure 2A:
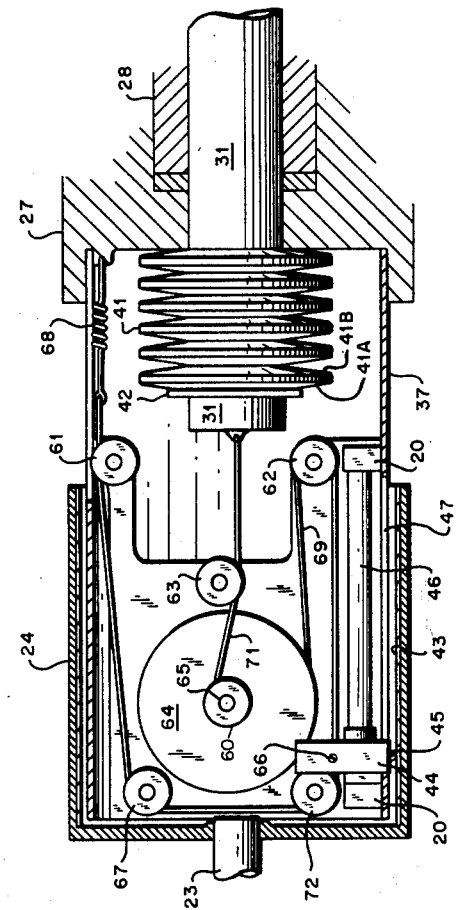
FIG. 2a is a sectional view taken along line 2—2 of FIG. 1 showing a first embodiment of the invention wherein an amplifier pulley system is used to transmit displacements to the stylus.

Referring to FIG. 2a the shaft 31 is shown as extended into casing 37 and has arranged thereon a plurality of Belleville washers 41. Each Belleville washer set 41 is composed of two Belleville washers 41a and 41b with the concave portions thereof arranged in a face-to-face relationship with each other.

A Belleville washer is a washer of the type having a dished shape which when assembled as herein described acts as a compression unit providing compact spring components capable of absorbing high loads within limited space with small deflection. An arrangement of Belleville washers having varying thicknesses provides measurable deflection under light loads within a predetermined load range. It has been determined that a series of Belleville washers assembled in pairs with the washers in each group arranged with the concave portions in face-to-face relationship, will act effectively as a spring under a compressive force. More importantly, the spring action of a series of washers so arranged is linear in relation to the compressive force applied. In other words, the amount of deflection of a series of washers arranged as above described will vary as a linear function of the load applied. The deflection of the washer assembly may be kept within narrow limits for any range of loading by using a series-parallel arrangement of the washers.

Continuing with the description of FIG. 2a, a collar 42 is formed integral with one end of shaft 31 and the Belleville washers are arranged on shaft 31 between the collar 42 and plug 27. Thus the tensional force which exists in towline 12 under load is converted through shaft 31 and the Belleville washer assembly into a compressional force on the Belleville washers with the Belleville washers allowing the shaft 31 to displace a discrete distance equivalent to a discrete tensional force on the line. The displacement of shaft 31 will therefore vary linearly with the tension in the towline.

As shown in FIG. 2a, a recording drum 24 has on the inside periphery thereof a recording medium 43. For example, a cylinder of paper may be attached to the inside periphery of the recording drum 24. A stylus 44 has a point 45 composed of a material such as graphite adjacent to and touching the recording medium 24. As drum 24 rotates the recording medium is marked by the point 45. Stylus 44 is slidably mounted on shaft 46 which is rigidly secured to casing 37 by supports 20. Thus the stylus 44 is movable relative to recording drum 24 in a direction parallel to the axis of the recording drum 24.

Stylus 44 is connected to the shaft 31 by means of an amplifier pulley system wherein displacement of shaft 31 will cause the stylus to displace along the recording drum a distance proportional to displacement of shaft 31. A pulley string 69 is attached to stylus 44 at a point 66 on the stylus. The pulley string 69 is wrapped around and has one terminal on pulley 64 which rotates about an axis 65. Pulley string 69 then turns around pulley 62 and is fixed to stylus 44 at point 66 and thereafter is guided by pulleys 72, 67, 61 to a spring 68 which is permanently fixed to plug 27.

Pulley string 71 is attached to shaft 31 and loops around pulley 63 and terminates on pulley 60 which is rigidly attached to pulley 64 and rotates about the same axis 65 as pulley 64.

Thus, any displacement of pulley string 71 results in an amplified displacement of pulley string 69 to cause stylus 44 to slide up and down shaft 46 in a varying manner dependent on the variations of tension in the towline.

When the recording tensiometer is inserted as part of the towline in a supersonic target towing system, the motor 21 functions to rotate cylinder 24 at a constant speed. The tension appearing in cable 12 at any time will result in a proportional compressional linear displacement of the Belleville washer assembly whereby shaft 31 will have its motion transmitted through the pulley amplifier system to cause the stylus 44 to follow the movements of shaft 31. The stylus will therefore vary its position as the tension varies and thus make a permanent record on the recording paper indicative of the variations and tensions in the towline.

Figure 2B:
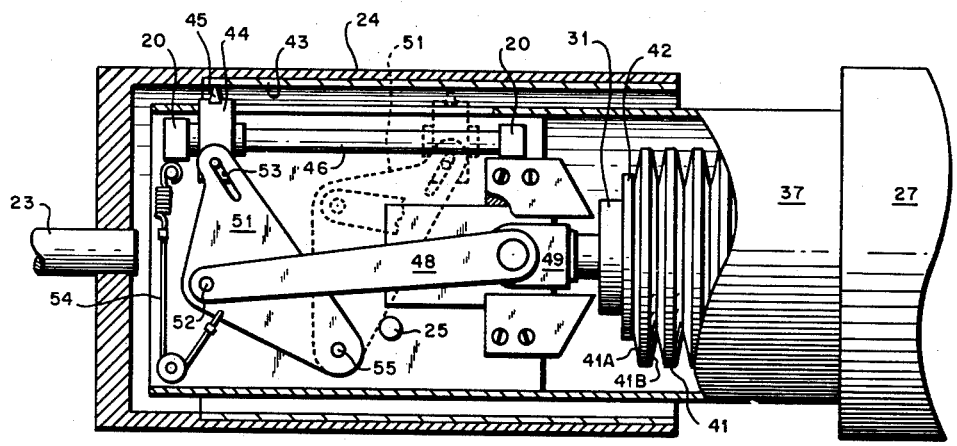
FIG. 2b is a sectional view of FIG. 1 taken along line 2—2 showing a second embodiment of the invention wherein a rod and cam arrangement is used as the linkage.

FIG. 2b shows an alternate embodiment of the invention wherein the pulley amplifier system of FIG. 2a is replaced by a mechanical linkage system.

As shown in FIG. 2b, a connecting rod 48 is connected to the shaft 31 by means of swivel assembly 49. The connecting rod 48 is connected to a cam link 51 at a pivot point 52 on the cam link. The cam link is connected to the stylus 44 by a sliding slot arrangement 53. Upon movement of the shaft 31 in response to a tension in the line, the connecting rod 48 will cause cam link 51 to rotate about an axis 55 whereby the stylus 44 is made to move in a direction axial to the shaft 46 a distance proportional to the displacement of Belleville washer assembly. As can be seen from the drawing, the stylus has a limit imposed on it by a stop pin 25 whereby it reaches a limiting position as shown by dotted lines in FIG. 2b. The axis 55 is anchored to the wall of the casing 37 in any convenient manner. Spring means 54 insures a return of the stylus to its initial position when no load exists on the towline. Thus the stylus 44 will displace linearly along the axis of the drum 24 according to the tensional force in the towline.

Obviously many modifications and variations of the present invention are possible in the light of the above teachings. It is therefore to be understood that within the scope of the appended claims, the invention may be practiced otherwise than as specifically described.

What is claimed is:

1. A recording tensionometer for recording target towline tension as a function of time comprising, in combination: a tubular housing having an opening at each end, a plug within said housing fixedly secured thereto, a first swivel assembly adapted to connect said plug to one end of a towline passed through one of said openings, a constant speed motor attached to and held by said plug, a cylindrical drum in axial alignment with said motor and having a recording surface on the internal periphery thereof, a shaft connecting said motor to said drum whereby said drum is rotated at a constant speed by said motor, an apertured member secured within said housing, an elongated member having a collar integrally formed at one end thereof, said elongated member being disposed through said apertured member to be movable with respect to said apertured member, a plurality of pairs of dished washers mounted on said elongated member between said collar and said apertured member with the washers in each pair being arranged with the concave surfaces thereof in a face-to-face relationship, means to apply a tensional force to the other end of said elongated member whereby said collar exerts a compressional force on said plurality of pairs of dished washers and whereby said elongated member is linearly displaced an amount proportional to said tensional force, said last mentioned means comprising a second swivel assembly adapted to connect the other end of said elongated member to one end of another towline passed through the other of said openings, a stylus assembly mounted within said recording drum for axial movement with respect to said drum and having a marker adapted to engage said recording surface, amplifier pulley assembly means including rotatable pulley means, first pulley string means connecting said pulley means to said elongated member, second pulley string means connecting said pulley means to said stylus assembly whereby said stylus assembly is displaced through a distance relative to said drum which is a multiple of the distance through which said elongated member is displaced.

2. A recording tensiometer for recording target towline tension as a function of time comprising, in combination: a tubular housing having an opening at each end, a plug within said housing fixedly secured thereto, a first swivel assembly adapted to connect said plug to one end of a towline passed through one of said openings, a constant speed motor attached to and held by said plug, a cylindrical drum in axial alignment with said motor and having a recording surface on the internal periphery thereof, a shaft connecting said motor to said drum whereby said drum is rotated at a constant speed by said motor, a cylindrical member having an axially aligned bore therethrough secured within said housing, a thrust shaft having a collar integrally formed at one end thereof, said thrust shaft being disposed through said bore to be relatively movable with respect to said cylindrical member, a plurality of pairs of dished washers mounted on said thrust shaft between said collar and said cylindrical member with the washers in each pair being arranged with the concave surfaces thereof in a face-to-face relationship, means to apply a tensional force to the other end of said thrust shaft whereby said collar exerts a compressional force on said plurality of pairs of dished washers and whereby said thrust shaft is linearly displaced an amount proportional to said tensional force, said last mentioned means comprising a second swivel assembly adapted to connect the other end of said thrust shaft to one end of another towline passed through the other of said openings, a stylus assembly mounted within said recording drum for axial movement with respect to said drum and having a marker adapted to engage said recording surface, amplifier pulley assembly means including rotatable pulley means, first pulley string means connecting said pulley means to said thrust shaft, second pulley string means connecting said pulley means to said stylus assembly whereby said stylus assembly is displaced through a distance relative to said drum which is a multiple of the distance through which said thrust shaft is displaced.

References Cited in the file of this patent

UNITED STATES PATENTS

| | | |
|---|---|---|
| 334,613 | Richard | Jan. 18, 1886 |
| 399,676 | Leuner | Mar. 19, 1889 |
| 2,063,169 | Kemler | Dec. 8, 1936 |
| 2,723,560 | Exline | Nov. 15, 1955 |
| 2,779,192 | Rumble et al. | Jan. 29, 1957 |